United States Patent
Salameh

Patent Number: 5,906,377
Date of Patent: May 25, 1999

[54] POSITIVE COUPLING STRUCTURE

[76] Inventor: Ralf Salameh, Melanchtonstr. 123, D-75015 Bretten, Germany

[21] Appl. No.: 08/871,721

[22] Filed: Jun. 9, 1997

[30] Foreign Application Priority Data

Jul. 25, 1996 [DE] Germany .............. 196 30 152

[51] Int. Cl.$^6$ ...................... F16J 15/02
[52] U.S. Cl. ............................. 277/632
[58] Field of Search .............. 277/598, 630, 277/631

[56] References Cited

U.S. PATENT DOCUMENTS

| | | | |
|---|---|---|---|
| 3,625,527 | 12/1971 | Brindle | 277/591 X |
| 5,149,108 | 9/1992 | Leiszter | 277/631 |
| 5,149,109 | 9/1992 | Jelinek et al. | 277/631 |
| 5,236,203 | 8/1993 | Uchida et al. | 277/631 |

*Primary Examiner*—Anthony Knight
*Assistant Examiner*—Gary Grafel
*Attorney, Agent, or Firm*—Klaus J. Bach

[57] ABSTRACT

In a positive coupling structure for interconnecting a first element having a T-shaped projection with a neck and a head portion which extends from the neck portion in opposite directions and a second element which has a cut-out shaped corresponding to the T-shaped projection of the first element for snugly receiving the T-shaped projection, the opposite ends of the head portion are widened to form recesses in which the adjacent areas of the second element are firmly engaged.

4 Claims, 3 Drawing Sheets

POSITIVE COUPLING STRUCTURE

BACKGROUND OF THE INVENTION

The invention relates to a positive coupling structure between two elements, wherein the first element has a T-shaped projection with at least a first neck portion and a head portion, which is wide in comparison with the neck portion. The second element has a cut-out corresponding in shape to the projection of the first element.

Such coupling structures are known for example for use with relatively long gaskets as they are used for example in very large internal combustion engines. Very long gaskets are generally formed by providing various gasket sections, which are combined by coupling structures to a full area gasket structure.

Although the known couplings have very good properties with regard to pulling forces on the various components in the longitudinal direction of the gasket, they have the disadvantage that the edge areas defining the recesses have a relatively small material width. As a result, the edge areas can bend apart whereby the outer dimensions of the gasket change and the gasket protrudes from the respective machine elements in an undesirable manner. Under adverse conditions, the edge areas can bend apart to such a degree that the projection slides out of the recess in which it is received. This happens especially with relatively thin gaskets.

It is the object of the present invention to provide a positive coupling arrangement in such a way that edge areas do not bend apart when the elements to be joined are subjected to pulling.

SUMMARY OF THE INVENTION

In a positive coupling arrangement for interconnecting a first element having a T-shaped projection with a neck and a transvers head portion which extends from the neck portion in opposite directions and a second element which has a cut-out shaped corresponding to the T-shaped projection of the first element for snugly receiving the T-shaped projection, the opposite ends of the head portion are widened to form recesses in which the adjacent areas of the second element are firmly engaged.

The widened areas at the opposite ends of the transverse head portions provide for a recess in which the resective areas defining the cut-out are received which prevents the edges forming the cut-outs from bending apart. Similarly, the widened area prevents the edges delimiting the recess to move away from one another as the element with the projection is prevented, by the jointure of projection and recesses, to move out of engagement with the element having the cut-out.

Preferably, the T-shaped projection has a first and second transverse head portions of which the second is connected to the first by way of a second neck portion. With the second transverse head portion the surface area where the projection and the cutout are in engagement is substantially increased whereby the forces which are effective when the elements are pulled apart are more widely distributed.

In another particularly advantageous embodiment of the invention the projections and cutouts are formed by stamping with oppositely directed stamping action.

In this way, the cutting edges are rounded and the rounded end areas are directed against one another when the elements are assembled. Also, the elements can be assembled more easily as the projection is funnel-like guided into the cut-out.

Further features and advantages of the present invention will become apparent from the following description of a particular embodiment thereof on the basis of the accompanying drawings.

DESCRIPTION OF A PREFERRED EMBODIMENT

Figure 1:
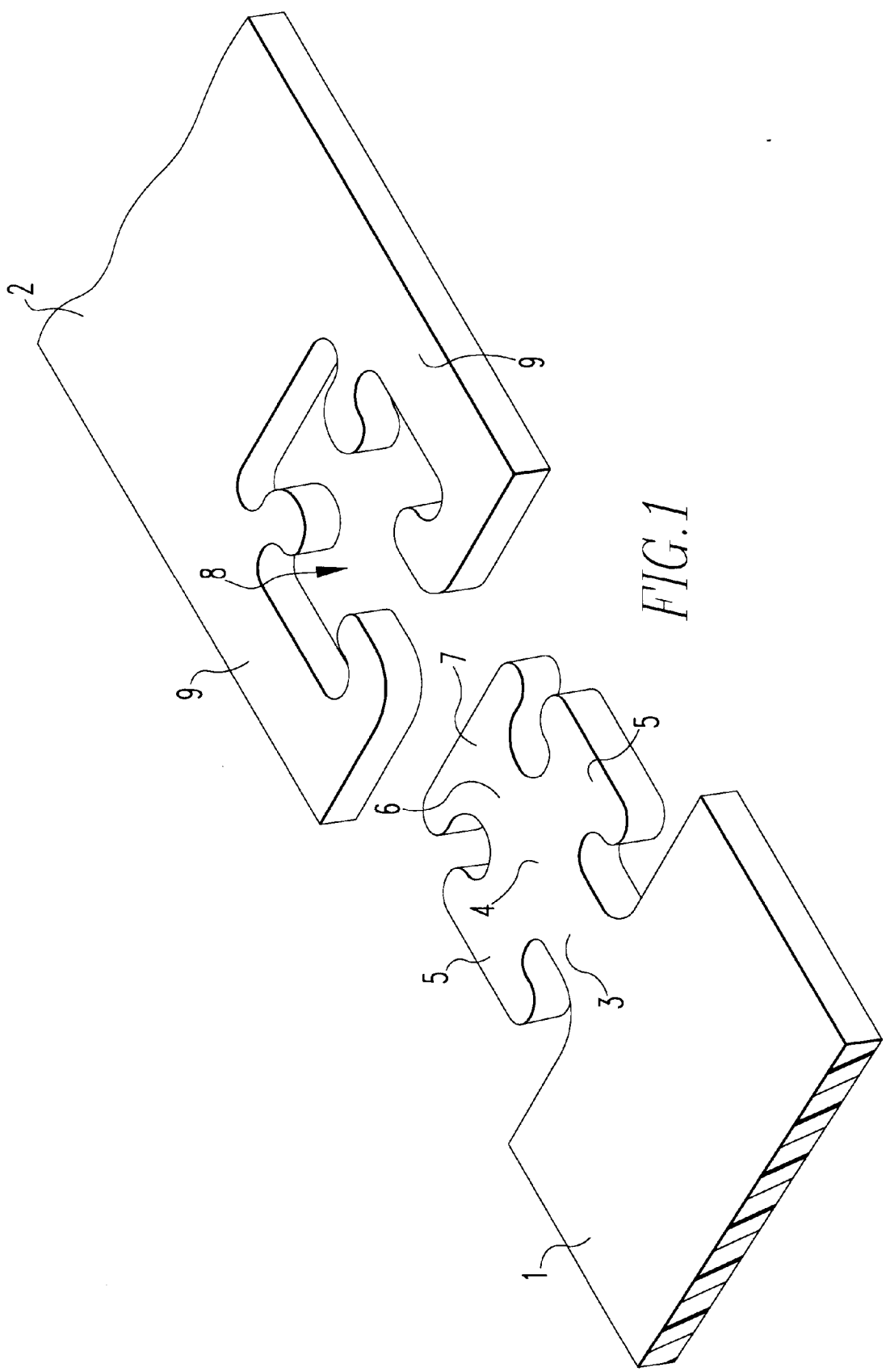
FIG. 1 shows two elements which can be joined by the coupling structure according to the invention.
Figure 2:
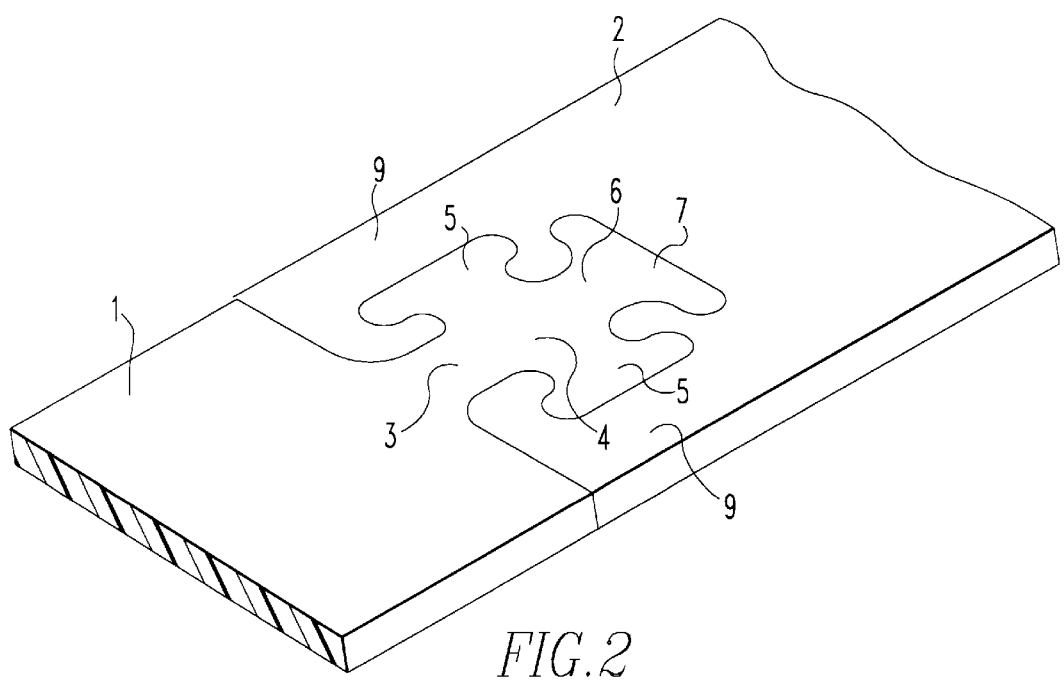
FIG. 2 shows the elements of FIG. 1 joined together.

As shown in FIG. 1, a first element 1 which is to be positively coupled with a second element 2 is provided with a projection 3, 4, 5, 6, 7 which is essentially T-shaped. The projection has a first neck 3 and a transverse head area 4, 5 wherein the neck 3 is formed by the vertical part of the T and the head 4, 5 is formed by the transverse beam of the T. The head portion 4, 5 has at its lateral ends, widened areas 5. The widened areas 5 extend the transverse beam of the T in a direction parallel to the neck 3. Above the transverse beam of the head portion 4, 5, there is provided a second transverse beam 7 which is centrally connected to the first beam 4, 5 by means of a second neck 6 and which extends about parallel to the first beam 4, 5.

The second element 2 includes a cutout 8, which has the same shape as the projection 3, 4, 5, 6, 7. The cutout 8 has marginal side areas 9, which are relatively narrow because of the cutout 8. Because the marginal side areas 9 are relatively narrow, they can be easily bent apart. This movement, however, is prevented when the projection 3, 4, 5, 6, 7 is received in the cutout 8. Then the marginal side areas 9 are held in place as portions thereof are received and engaged in the recess formed by the widened areas 5 of the beam 4, 5. As a result, the marginal side areas 9 are prevented from being bent apart.

Figure 3:
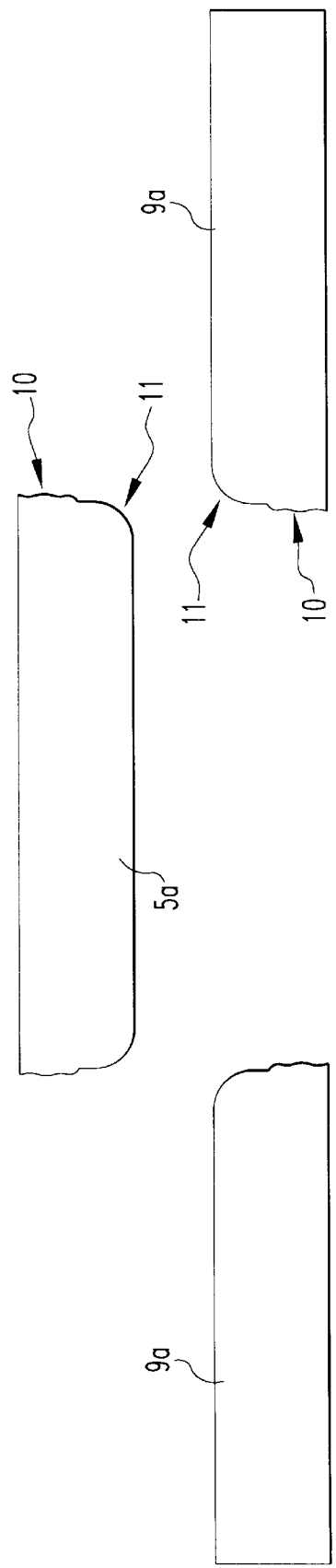
FIG. 3 shows the cutting edges formed on the elements by stamping in opposite directions.

As shown in FIG. 3, the cutting edges 10 have rounded areas 11 which are formed during stamping. Preferably, the projection and cut-out are formed by oppositely directed stamping action so that the rounded edges are formed as shown in the example given in FIG. 3; the elements 9a represent the edges of the element 2. The cut-out is stamped into the element 2 by a downwardly directed stamping action, so that the rounded edge areas 11 are formed on top. The element indicated in FIG. 3 by the reference numeral 5a is part of the element 1, that is, it is a section taken through the head 4, 5. It is formed by stamping in a direction from bottom to top so that the rounded edge areas 11 are formed at the bottom. With the rounded edges formed in this manner into the rims of the projection and the cutout, the projection 3, 4, 5, 6, 7 can be easily inserted into the cutout 8.

What is claimed is:

1. A positive coupling structure for interconnecting two material layer elements including a first element having a T-shaped projection with a first neck extending in a longitudinal direction and a head portion provided with a transversely extending structure forming sideward projections which extend normal to said longitudinal direction in opposite directions from said neck and have at their opposite ends end portions which are widened in said longitudinal direction, and a second element having a cut-out shaped corresponding to said T-shaped projection of said first element and sized so as to snugly receive said T-shaped projection.

2. An arrangement according to claim 1, wherein said T-shaped projection and said cut-out extend, in a direction transverse to the plane of said T-shaped projection, over the full thickness of said material layer elements.

3. An arrangement according to claim 1, wherein said T-shaped projection has a head with a first transversely extending portion and a second transversely extending portion spaced from said first transversely extending portion and connected to said first transversely extending portion by a second neck.

4. An arrangement according to claim 1, wherein said T-shaped projection and said cut-out have rounded edges at opposite sides of said first and, respectively, second elements.

\* \* \* \* \*